METHOD AND PRODUCT FOR STANDARDIZING TAPE RECORDING AND PLAYBACK SYSTEMS
Filed Dec. 6, 1965

INVENTOR.
RICHARD L. SHELLABARGER
BY *Elliott & Pastoriza*
ATTORNEYS

United States Patent Office 3,402,350

Patented Sept. 17, 1968

3,402,350

METHOD AND PRODUCT FOR STANDARDIZING TAPE RECORDING AND PLAYBACK SYSTEMS

Richard L. Shellabarger, 1348 Callens Road, Ventura, Calif. 93003

Filed Dec. 6, 1965, Ser. No. 511,606
4 Claims. (Cl. 324—70)

ABSTRACT OF THE DISCLOSURE

A method of standardizing tape recording and playback systems is provided by recording a series of electrical pulses on a moving tape. The series of pulses are recorded by employing a recording head and a reproduce head in fixed spaced relationship such that a recorded signal from the recording head will be reproduced by the reproduce head at the fixed distance from the recording head which reproduced signal in turn will trigger the recording head to record a second pulse on the tape. The process continues such that there are provided absolutely uniformly spaced pulses on the tape regardless of any flutter or variation in tape speed during the process. This tape with absolutely uniformly spaced pulses thereon can then be used to calibrate and check other tape recording and playback systems to provide an indication as to any deviations from absolute standard tape speeds.

The product of this invention constitutes the tape itself having the absolutely uniformly spaced pulses recorded thereon.

This invention relates to a method and product for standardizing tape recording and playback systems and more particularly to a unique magnetic tape product and method for manufacturing and using the same to enable any deviations from preset standards of operation of playback systems on which the product is utilized to be readily detected and measured.

In the past few years, there has been an enormous increase in the use of magnetic tape recording for instrumentation work. Tapes which have recorded information on them are frequently exchanged and played back on various different types of magnetic tape recorders. If tape speed errors occur in any of the tape playback systems, these errors can result in errors in the information itself. At the present time, there exists no standard or agreed-upon method between manufacturers, users, and instrument operators for checking tape speed accuracy in playback systems as well as in recording systems.

Of the various known methods, some involve simply marking a tape at two successive points between which the distance is known and then measuring the time for the points to pass a given reference point. The tape speed is then determined by simply dividing the distance between the marks by the time involved. This method, however, will only provide a speed indication of the tape at the particular time that the marks are passing the reference point. Further, there is not provided any type of continuous output information which would indicate any variation or flutter in the tape speed.

Another system employs a tape foot counter and timer which may be used to provide a continuous output reading of the tape speed. However, the counter and timer involve physical contact with the tape itself which may vary its tension as well as affect the speed of the tape which it is desired to measure. Further, the accuracy of the system is limited to the accuracy of the foot counter and timer mechanism.

Still another solution overcoming some of the disadvantages in the above methods contemplates the recording of a standard frequency signal on a magnetic tape by means of a standard machine which is known not to vary in speed. The recorded signal may then be played back on another tape recording machine which it is desired to calibrate or determine tape speed. The variations in frequency of the playback signal with the standard frequency, if any, will then provide an indication of deviations in the tape speed from a desired standard tape speed. The accuracy of this system, however, depends wholly on the capability of the standard machine providing the signal on the tape to operate in a uniform manner. Any deviations in the standard recording machine for producing the frequency signal on the tape will result in an inaccurate taped signal.

Most of the above methods as well as further methods presently known involve relatively expensive equipment if any worthwhile accuracy is to be realized.

Bearing the foregoing in mind, it is a primary object of the present invention to provide a method and product for standardizing tape recording and playback systems which overcomes the various disadvantages characterizing prior art systems, all to the end that a standard agreed-upon method and product may be provided for the industry.

More particularly, it is an object to provide a method and product of standardizing tape recording and playback systems wherein a standard tape is provided to be played on instruments to be standardized wherein the forming of recorded signals on the tape does not depend upon the accuracy of the tape speed in the recording system so that the final standardized tape constituting the product of this invention is uniformly consistent.

Another object in conjunction with the foregoing objects is to provide, as a part of the method, the step of conditioning the tape in such a manner that a rapid physical check of the tape can be conducted by a standard reference measure to insure quality control in the manufacture of the standardized tape product.

More general objects of this invention are to provide a novel method and product for enabling the detection of speed variations from a given standard, skew problems, gap scatter, intertrack or time displacement errors, and overall stability of different tape recording and playback systems without the need of expensive and specialized equipment.

Particular objects of this invention are to provide a method and product for enabling the detection of speed variations in a tape playback system from a standard speed to an accuracy of one part in 25,000; to enable a continuous indication to be provided of tape speed in a playback system being standardized or under test so that stability of the apparatus over long running periods may be determined; and provide other information relating to multichannel operation of a recorder and quality of recording and reproducing or playback heads.

Briefly, these and many other objects and advantages of this invention are attained by providing a standardized magnetic tape product formed and used by the method of the invention. In accord with the steps of the method, the magnetic tape is run through a recording and playback machine wherein the recording and playback heads are at a fixed constant physical spacing relative to each other. As the tape passes the recording head at a first point, a pulse is externally triggered into the head to provide a recorded pulse on the tape. As the tape moves past a second point juxtaposed the playback or reproducing head, this signal is detected in the reproducing head and then utilized to trigger the generation of another pulse to the recording head. This pulse is then recorded on the tape as it passes the first point at the recording head. When the second recorded pulse then passes the second point, it is detected in the playback head and utilized to trigger generation of yet another pulse in the recording head so that a third pulse is recorded on the tape as it passes the given point at the recording head. The signal detected by the pickup head of each pulse recorded by the recording head is thus fed back into the recording head to effect further recording of a pulse so that there results a series of pulses on the tape at uniform spaced intervals corresponding to the exact physical distance between the recording and playback heads.

It will be evident from the foregoing method that the speed of the tape past the recording and reproducing heads does not affect the physical spacing between the recorded pulses so that the intervals between the pulses on the finished recorded tape are consistent. The only important criteria for the recording apparatus in producing the tape product is the assurance that a given standard fixed distance is maintained between the recording and playback heads.

The magnetic tape produced by the above method may then be utilized to standardize other magnetic tape recording and playback systems. Towards this end, the method contemplates the further steps of simply playing the standard tape in a playback system and feeding the output to a frequency counter which, in the preferred embodiment, converts the number of pulses received to a signal constituting a function of the frequency, such as a period. If this signal deviates from the standard signal corresponding to a standard frequency, it is known that there is an error in the absolute tape speed in the playback system. Further, the degree of deviation will enable a measurement of such error in absolute tape speed.

The method may be employed for recording simultaneously signals on multichannel or multiple track tapes and by detecting signals on adjacent tracks, intertrack errors may be readily determined as well as skew problems, if any, inherent in a playback system.

A better understanding of the method and product of this invention will be had by now referring to the accompanying drawings, in which.

Figure 1:
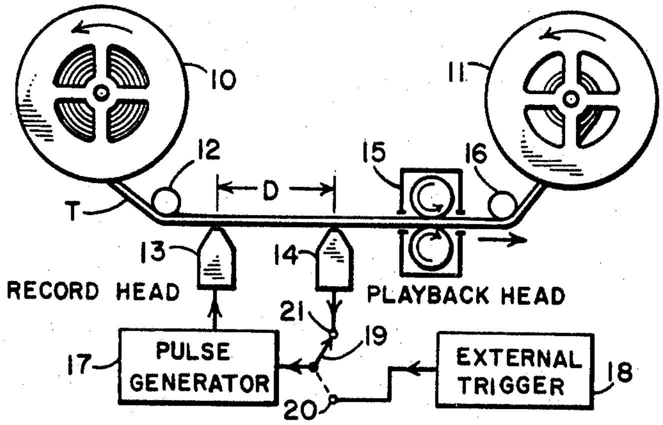
FIGURE 1 is a diagrammatic plan view partly in block form of a recording and playback tape system for providing a standardized magnetic tape product in accordance with the method and product of this invention.

Referring first to FIGURE 1, there is shown a magnetic tape recording and playback system including a supply reel 10 and takeup reel 11. A magnetic tape T passes over a first guide roller 12 past a first point juxtaposed a magnetic recording head 13, thence past a second point juxtaposed a magnetic playback head 14. The spacing between the recording head 13 and playback head 14 is accurately determined to correspond to a constant physical dimension D. This spacing, for purposes of illustrating the invention, may be one and one-half inches.

The tape is driven by the usual capstan system designated generally at 15 over a second guide roller 16 to the takeup reel 11.

Connected to the recording head 13 is a pulse generator 17 adapted to provide an electrical pulse to the recording head in response to a triggering signal to effect a recording of the pulse on the tape as it passes the first point juxtaposed the recording head. An initial electrical pulse is recorded on the tape T by means of an external trigger circuit 18 arranged to pass a pulse through a switch arm 19, when in the dotted line position to engage the external trigger terminal 20. After a first pulse has been recorded on the tape T, the switch arm 19 is moved to its solid line position to engage a terminal 21 connecting from the playback head 14.

With the foregoing arrangement, when the first recorded pulse passes the playback head 14, it will be detected to provide a trigger signal through the terminal 21 and switch arm 19 to the pulse generator 17, thereby providing another pulse which is immediately recorded on the tape T. This other pulse, when it passes the playback head 14, will then again trigger the pulse generator 17 to effect recording of a third pulse on the tape. It will be evident accordingly that a series of pulses are recorded on the tape, these pulses being spaced at exact intervals corresponding to the distance D.

Further, it will be evident that the distance D will be constant even though the speed of the tape T between the recording and playback heads may vary.

Figure 2:
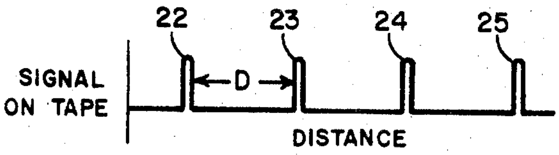
FIGURE 2 is a diagram indicating the nature of signals recorded on the tape of FIGURE 1.

FIGURE 2 diagrammatically illustrates a series of the electrical pulses recorded on the tape as at 22, 23, 24, and 25. As indicated, these pulses are spaced apart exactly by the physical distance D. The width of the electrical pulse recorded may be of the order of 70 microseconds.

Figure 3:
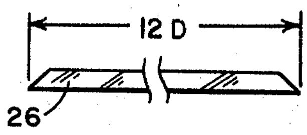
FIGURE 3 is a side elevational view of a standard measuring bar constituting a physical reference for checking the tapes produced by the mechanism of FIGURE 1 for proper quality control.

In accordance with a feature of the method of this invention, it is possible to provide a physical marking on the tape at exactly the points of the recorded pulses 22, 23, and so forth, which mark is visible. After a tape has had signals recorded thereon and the signals are visibly marked, it is a very simple matter to check the accuracy of the spacing between the pulses by means of a standardized physical measuring reference. Such a reference is shown in FIGURE 3 in the form of an elongated bar 26. The exact distance between the ends of this bar is an integral multiple of the distance D, and in the example chosen for illustrative purposes, this multiple may constitute twelve so that the bar is a total of exactly eighteen inches long.

By positioning the bar along the tape so that one end is exactly in registration with one of the visible marks designating a pulse, the other end should exactly correspond with the thirteenth pulse marking. The length of the physical bar 26 is accurate within plus or minus 50 microinches. The accuracy of recording the spaced signals can be carried out to within plus or minus 100 microinches. Accordingly, any detectable deviation of the distance covered by the twelve consecutive spaces between the first and thirteenth pulses and the overall length of the reference bar 26 will indicate that the spacing between the recording and playback heads is incorrect on the machine of FIGURE 1, or, alternatively, there is a delay in the electronic triggering or stray signals have been introduced. The use of the bar 26 as a reference enables a desired quality control of produced magnetic tapes so that standardization is assured with respect to the spacing of the signals on the tape.

Figure 4:
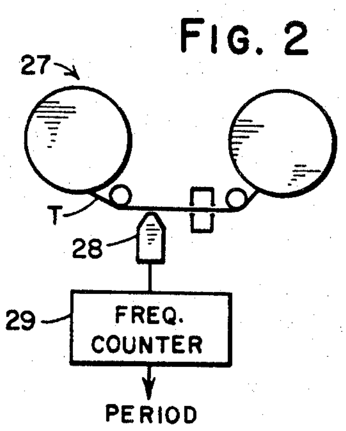
FIGURE 4 is a schematic view of a playback system being calibrated by the product of this invention.

Referring now to FIGURE 4, there is shown a typical tape playback system upon which the tape produced by the mechanism of FIGURE 1 may be played to properly determine whether the playback system is operating at proper tape speed as well as to determine other characteristics of the playback system. Towards this end, when the tape T is played in the playback system 27, the successive pulses are detected by the playback head 28 and passed to a frequency counter 29. The frequency counter converts the frequency into a period indication which may be continuously observed. Thus, when a speed for the playback system is selected, the resulting period in microseconds between successive pulses detected by the playback head, is given by the formula:

$$\frac{10^{-6}}{\frac{\text{selected tape speed}}{1.5}}$$

As an example, if the selected tape speed is 60 inches per second, the period of the frequency counter should read 25,000 microseconds. If the frequency counter indicates 25,100 microseconds at the beginning of the tape, an error of 100 microseconds or .4 percent would be present in the tape speed of the playback system. If the frequency counter indicated 25,050 microseconds at some later time, the error would be .2 percent; and there would thus be indicated a change in the tape speed.

From the use of a simple frequency counter, together with the standardized tape provided by the mechanism of FIGURE 1, it will thus be evident that various different magnetic tape playback systems, as well as recording systems, may be tested for accuracy in playback or recorded tape speeds. Further, since the monitoring of the tape speed is continuous, flutter and other variations, if any, will also be detected.

Figure 5:
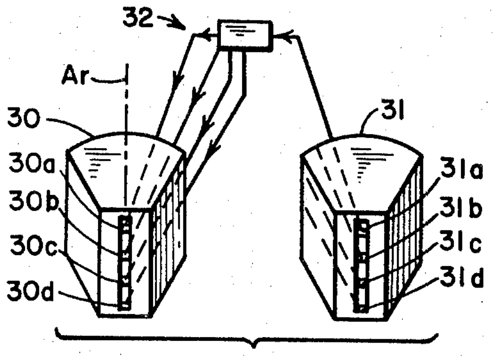
FIGURE 5 is a perspective view of a recording and playback head for multichannel or multitrack recording on a single magnetic tape; and, FIGURE 6 is a plan view of a fragmentary portion of a multitrack magnetic tape product in accordance with the present invention.

FIGURE 5 illustrates, in partly perspective and partly diagrammatic form, a recording head 30 and playback head 31 for a four-track tape wherein the recording head 30 includes four individual recording mechanisms 30*a*, 30*b*, 30*c*, and 30*d* spaced transverse to the direction of motion of the tape and the playback head 31 similarly includes pickup mechanisms 31*a*, 31*b*, 31*c*, and 31*d* similarly spaced transversely to the direction of motion of the tape. As in the mechanism of FIGURE 1, there is provided a feedback path from any one of the playback mechanisms, such as 31*a*, through a suitable trigger and pulse generating circuit 32 to provide a set of four pulses to the recording mechanisms, so that the recorded pulse in the first track on the tape is utilized by the playback head to initiate recording of the next set of pulses and so forth.

In preparing a standard tape with the multiple track system of FIGURE 5, the spacing between the recording head 30 and playback head 31 again is fixed at an exact physical distance corresponding to the distance D as in FIGURE 1. In addition, the alignment of the recording mechanisms 30*a* through 30*d* is carefully engineered to lie along an axis such as indicated at A*r* which is normal to the direction of travel of the tape.

With the above arrangement, pulses are recorded on the respective tracks individually. The spacing between the pulses corresponds to the spacing between the recording and playback heads as before, and the pulses at any one time in transverse alignment on adjacent tracks are such that a line drawn between the adjacent pulses will be normal to the direction of movement of the tape.

Figure 6:
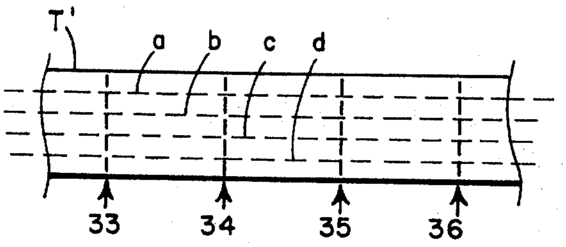

FIGURE 6 illustrates in visual form by means of dashes the various signals recorded on the tracks. Thus, a portion of the standardized tape provided by the mechanism of FIGURE 5 is illustrated at T′, the four recording tracks or channels being indicated by the letters *a, b, c,* and *d.* At the point 33, there are illustrated four pulses or signals on the adjacent tracks, all in vertical alignment with each other. At the spacing D from the first set of pulses 33, there are provided a second set of pulses 34, and a third set at 35, and a fourth set at 36, all successively spaced at equal intervals.

When the standard tape T′ is played back through a multichannel playback system, it is possible to individually detect the signals in the respective playback mechanisms in the playback head of the system. From these detected signals, it is possible to compare the relative time relationship of the signals detected in one track, such as the track *a*, with signals in another of the tracks, such as the track *b*, or the track *c* and from the time relationship determine if there is any skew present in the playback head which might result from a slight displacement or tilting of the playback head with respect to the direction of motion of the tape. It is thus possible to check the quality of various different playback systems with respect to the capabilities of recording and reproducing on multiple channels various information signals. The same tape T′, of course, may be utilized to check the tape speed or variations in tape speed as described in conjunction with FIGURES 1, 2, and 3.

From the foregoing description, it will be evident that the present invention has provided a vastly improved method and novel product in the form of a standardized tape which will enable calibration and standardization of tape recording and reproducing machines throughout industry without the necessity of complicated equipment. Further, the accuracy of the measurements realizable by means of the present method and product far exceed those obtainable with any prior methods heretofore available.

Accordingly, it will be clear that the various objects of this invention have been fully realized.

What is claimed is:

1. A method of standardizing tape recording and playback systems comprising the steps of: recording an electrical pulse on a moving tape as it passes a first point; reproducing the recorded pulse on said tape as it passes a second point spaced on a given constant physical distance along said tape from said first point; utilizing the reproduced pulse to trigger the recording of another pulse on said tape as it passes said first point; reproducing said another pulse at said second point; utilizing the reproduced another pulse to trigger the recording of still another pulse on said tape as it passes said first point; repeating the foregoing steps to provide a series of recorded pulses on said tape spaced at intervals corresponding to said given constant distance; playing said tape on a tape playback system to reproduce said pulses; and providing an indication constituting a function of the frequency of said pulses whereby deviations in the absolute tape speed in said playback system from a given standard absolute tape speed at which the frequency of said pulses is a fixed quantity may be detected.

2. The method of claim 1, including the steps of individually recording additional pulses on adjacent tracks on said tape as it passes said first point; individually reproducing said additional pulses recorded on said tape as it passes said second point; and individually utilizing the reproduced additional pulses to inividually trigger the recording of other individual additional pules on said adjacent tracks as said tape passes said first point, all in the same manner as said first-mentioned pulses are recorded to provide a series of recorded pulses in adjacent tracks of said tape at intervals corresponding to said given distance, whereby the timed relationship between pulses in one track may be compared to the timed relationship of pulses in another of said tracks when played back in said playback system to thereby enable any skewing in the alignment of the playback head of said system in detecting pulses in adjacent tracks recorded at the same time, to be determined.

3. A product for standardizing tape recording and playback systems comprising: a magnetic tape having a series of recorded pulses thereon at uniformly spaced intervals corresponding to a given standard spacing, said pulses being uniformly spaced by moving the tape past a recording head and a reproducing head which are fixed at a standard spacing from each other and recording an electrical pulse on the moving tape as it passes the recording head; reproducing the recorded pulse from the tape as it passes the reproducing head; utilizing the reproduced pulse to trigger the recording of another pulse on the tape as it passes the recording head; reproducing the said another pulse at the reproducing head; utilizing the reproduced another pulse to record still another pulse on the tape as it passes the recording head; and repeating the foregoing steps to provide said series of recorded pulses, whereby reproducing said pulses in a playback system enables deviations in the absolute tape speed through said playback system to be detected and measured.

4. A product according to claim 3, in which said magnetic tape includes at least one additional track having recorded thereon a series of pulses at uniformly spaced intervals corresponding to said given standard spacing in the same manner as said first-mentioned pulses, said pulses being respectively transversely aligned with said first-mentioned pulses such that a line drawn between corresponding timed pulses in adjacent tracks is normal to the direction of travel of said tape.

References Cited

UNITED STATES PATENTS

| | | | |
|---|---|---|---|
| 2,530,564 | 11/1950 | Blaney | 179—100.2 |
| 2,603,688 | 7/1952 | Cole | 324—70 |
| 2,762,013 | 9/1956 | Chandler | 324—70 |
| 2,786,895 | 3/1957 | Rettinger | 179—100.2 |
| 2,877,415 | 3/1959 | Rolle | 324—70 |
| 2,937,239 | 5/1960 | Garber | 179—100.2 |
| 2,989,690 | 6/1961 | Cook | 324—70 |

FOREIGN PATENTS

| | | |
|---|---|---|
| 749,525 | 5/1956 | Great Britain. |
| 818,782 | 8/1959 | Great Britain. |

RUDOLPH V. ROLINEC, *Primary Examiner.*

M. J. LYNCH, *Assistant Examiner.*